US008676126B2

(12) United States Patent
Ahn et al.

(10) Patent No.: US 8,676,126 B2
(45) Date of Patent: Mar. 18, 2014

(54) APPARATUS AND METHOD FOR ACQUIRING CHANNEL INFORMATION IN A RADIO COMMUNICATION SYSTEM

(75) Inventors: Jae-Hyun Ahn, Seoul (KR); Jung-Nam Yun, Seongnam-si (KR); Jun-Seong Park, Seongnam-si (KR)

(73) Assignee: Intellectual Discovery Co., Ltd., Seoul (KR)

( * ) Notice: Subject to any disclaimer, the term of this patent is extended or adjusted under 35 U.S.C. 154(b) by 294 days.

(21) Appl. No.: 13/142,838

(22) PCT Filed: Dec. 28, 2009

(86) PCT No.: PCT/KR2009/007817
§ 371 (c)(1),
(2), (4) Date: Jun. 29, 2011

(87) PCT Pub. No.: WO2010/077030
PCT Pub. Date: Jul. 8, 2010

(65) Prior Publication Data
US 2011/0269450 A1   Nov. 3, 2011

(30) Foreign Application Priority Data

Dec. 31, 2008   (KR) .................. 10-2008-0138607

(51) Int. Cl.
*H04B 1/00* (2006.01)
(52) U.S. Cl.
USPC ....... 455/63.1; 455/450; 455/452.2; 455/453; 455/447; 370/229; 370/230.1; 370/231; 370/329; 370/341; 370/431
(58) Field of Classification Search
USPC .............. 455/422.1, 450–455, 464, 509, 455/436–444, 405–408, 63.1–63.4; 370/321–337, 339, 341–348, 431–463, 370/229–240
See application file for complete search history.

(56) References Cited

U.S. PATENT DOCUMENTS

| 6,141,552 A * | 10/2000 | Sendonaris et al. .......... 455/436 |
| 2004/0203882 A1 * | 10/2004 | Laiho et al. ................. 455/456.1 |
| 2008/0037464 A1 * | 2/2008 | Lim et al. ..................... 370/329 |
| 2009/0059861 A1 * | 3/2009 | Gunnarsson et al. ......... 370/331 |

FOREIGN PATENT DOCUMENTS

| KR | 10-2008-0084087 A | 9/2008 | |
| KR | 10-2008-0086726 A | 9/2008 | |
| WO | WO 2005-088870 A | 9/2005 | |
| WO | WO 2006/068556 | * 6/2006 | ............... H04Q 7/38 |

OTHER PUBLICATIONS

International Search Report for PCT/KR2009/007817 filed on Dec. 28, 2009.
Written Opinion for PCT/KR2009/007817 filed on Dec. 28, 2009.

* cited by examiner

*Primary Examiner* — Ronald Eisner
(74) *Attorney, Agent, or Firm* — Sughrue Mion, PLLC

(57) ABSTRACT

The present invention relates to an apparatus and to a method for acquiring downlink channel information in a radio communication system having a multi-cell/sector structure, comprising receiving channel quality information of a mobile station and loading information of cells/sectors adjacent to the mobile station, checking the carrier to interference and noise ratio (CINR) contained in the channel quality information, checking the average loading factor of the adjacent cells/sectors contained in the loading information, summing the average loading factors for each of the adjacent cells/sectors to calculate an effective loading factor, and compensating for the CINR with the effective loading factor to acquire channel information of the base station.

8 Claims, 3 Drawing Sheets

APPARATUS AND METHOD FOR ACQUIRING CHANNEL INFORMATION IN A RADIO COMMUNICATION SYSTEM

TECHNICAL FIELD

The present invention relates generally to a radio communication system, and more particularly to an apparatus and method for acquiring downlink (hereinafter, referred to as 'DL') channel information in a radio communication system having a multi-cell or multi-sector structure.

BACKGROUND ART

An IEEE (Institute of Electrical and Electronics Engineers) 802.16 communication system that employs OFDM (Orthogonal Frequency Division Multiplexing)/OFDMA (Orthogonal Frequency Division Multiple Access) is proposed as a BWA (Broadband Wireless Access) system, in order to support a broadband transmission network for physical channels of the wireless communication system. The IEEE 802.16 communication system is a system that considers not only a fixed state but also a mobile state of a subscriber station, wherein the subscriber station having mobility can be referred to as mobile station (hereinafter, referred to as 'MS').

In a radio communication system, the MS within multi-cells or multi-sectors estimates DL channel when receiving data from a base station (hereinafter, referred to as 'BS'), measures CINR (Carrier to Interference and Noise Ratio) of the estimated DL channel, and reports CQI (Channel Quality Information) containing the CINR to the BS. In this case, the MS estimates the DL channel by using pilot signals when receiving data from the BS, and measures the CINR of the DL channel by using the pilot signals. For example, the MS measures the CINR by using all pilots in a DL sub-frame or by using pilots located in allocation region for the MS in a DL sub-frame, and reports the CQI containing the CINR to the BS.

If the MS exactly estimates the DL channel by using the pilot signals, the CINR is exactly measured in the estimated DL channel. Thus, the MS reports the CQI containing the exact CINR to the Bs, and the scheduler of the BS faithfully performs the scheduling by using the exact CINR included in the CQI and exactly controls the scheduling.

However, in case that the MS measures the CINR by using pilots located in allocation region for the MS in a DL sub-frame, it is difficult for the MS to exactly estimate the DL channel and to exactly measure the CINR because the MS can not use sufficient pilots for channel estimation and CINR measurement. In particular, in a communication environment that channel state varies according to time, the MS performs wrong channel estimation.

Also, in case that the MS measures the CINR by using all pilots in a DL sub-frame and reports the CQI containing the measured CINR to the BS, it is difficult for the MS to exactly estimate the DL channel and to exactly measure the CINR because not all pilots are dedicated to the MS. Moreover, in a multi-cells or multi-sector environment, the burst region of the MS in DL sub-frame can be overlapped with burst regions corresponding to other MSs in cells or sectors adjacent to the MS or interfered with cells or sectors adjacent to the MS. Thus, the MS performs wrong channel estimation for the burst region owing to interferences of adjacent cells or sectors.

Therefore, the MS reports the CQI containing erroneous CINR to the BS, and the scheduler of the BS receives the CQI containing erroneous CINR. Consequently, the scheduler can not perform the scheduling faithfully owing to erroneous CINR, and the waste of resource and transmission power and the decrease of the transmission rate occur. Thus, there is a demand for new scheme that can acquire exact CINR in DL channel so as to exactly perform the scheduling and the scheduling control.

DISCLOSURE

Technical Problem

Therefore, the present invention has been made in view of the above-mentioned demands, and it is an object of the present invention to provide an apparatus and method for acquiring channel information by using CQI reported from the MS in a radio communication system.

It is another object of the present invention to provide an apparatus and method for acquiring CINR of DL channel to exactly perform scheduling and control for the MS in a radio communication system.

It is further another object of the present invention to provide an apparatus and method for acquiring channel information for the MS to determine and control resource allocation, MCS (Modulation and Coding Scheme) level, transmission power level for the MS, in a radio communication system.

Technical Solution

According to one aspect of the present invention, there is provided an apparatus for acquiring channel information in a radio communication system, the apparatus comprising: a CINR (Carrier to Interference and Noise Ratio) checking unit for checking a CINR from channel quality information of a mobile station; a loading checking unit for checking an average loading factor of adjacent cells or sectors from loading information of cells or sectors adjacent to the mobile station; and a CINR compensation unit for calculating an effective loading factor of adjacent cells or sectors by using the average loading factor, and compensating the CINR with the effective loading factor.

According to another aspect of the present invention, there is provided a method for acquiring channel information in a radio communication system, the method comprising: receiving channel quality information of a mobile station and loading information of cells or sectors adjacent to the mobile station; checking a CINR (Carrier to Interference and Noise Ratio) contained in the channel quality information; checking an average loading factor of adjacent cells or sectors contained in the loading information; calculating an effective loading factor by using the average loading factor; and acquiring channel information of the mobile station after compensating the CINR with the effective loading factor.

Advantageous Effects

The present invention, in a radio communication system, can efficiently determine and control resource allocation, MCS (Modulation and Coding Scheme) level, and a transmission power level for the MS by acquiring exact CINR reflecting interferences in multiple cells or multiple sectors. Thus, the present invention also can prevent waste of resources and transmission power for the MS and increase data transmission rate.

DESCRIPTION OF THE DRAWINGS

The above and other aspects, features and advantages of the present invention will become more apparent from the following detailed description when taken in conjunction with the accompanying drawings in which.

MODE FOR INVENTION

Figure 1:
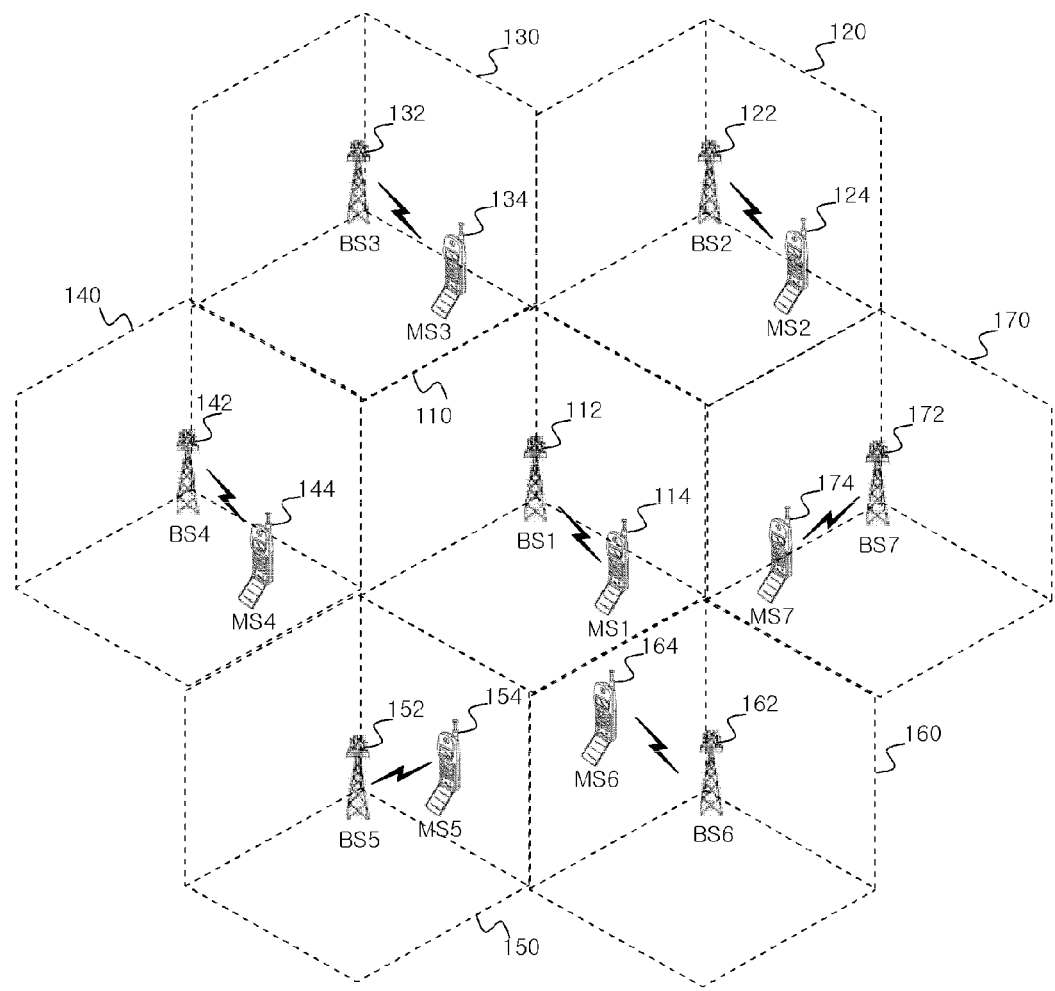
FIG. 1 is a diagram illustrating a structure of a radio communication system according to an embodiment of the present invention.

Preferred embodiments of the present invention will now be described in detail with reference to the annexed drawings. In the drawings, the same or similar elements are denoted by the same reference numerals even though they are depicted in different drawings. In the following description, a detailed description of known functions and configurations incorporated herein has been omitted for clarity and conciseness.

The present proposes an apparatus and method for acquiring channel information in a radio communication system, e.g. the IEEE 802.16 communication system that is a kind of the BWA system. Also, the present invention proposes an apparatus and method for acquiring channel information so as to perform scheduling and scheduling control for data transmission/reception between the BS and the MS in a radio communication system having a multi-cell or multi-sector structure.

Hereinafter, with reference to FIG. 1, a structure of a radio communication system having a multi-cell or multi-sector structure according to an embodiment of the present invention will now be described.

FIG. 1 is a diagram illustrating a structure of a radio communication system according to an embodiment of the present invention.

Referring to FIG. 1, the radio communication system includes BSs 112, 122, 132, 142, 152, 162, 172 respectively taking charge of cells 110, 120, 130, 140, 150, 160, 170 and MSs 114, 124, 134, 144, 154, 164, 174 receiving communication service from BSs 112, 122, 132, 142, 152, 162, 172 in cells 110, 120, 130, 140, 150, 160, 170, in multi-cells and multi-sectors structure, wherein one cell includes three sectors. Herein, the MSs 114, 124, 134, 144, 154, 164, 174 are static and/or mobile, and signal transmission/reception between the BSs 112, 122, 132, 142, 152, 162, 172 and the MSs 114, 124, 134, 144, 154, 164, 174 are performed based on OFDM/OFDAM scheme.

The BSs 112, 122, 132, 142, 152, 162, 172 receive CQI (Channel Quality Information) from the MSs 114, 124, 134, 144, 154, 164, 174, and also receive loading information about other cells or sectors from other BSs through backbone network. Then, the scheduler of each BS receives the CQI and loading information, checks CINR (Carrier to Interference and Noise Ratio) from the CQI, checks loading factor from the loading information, and acquires CINR in DL as channel information for the MS after compensating the CINR based on the loading factor. The scheduler allocates resources for the MSs by using the acquired CINR, determines the MCS level and transmission power level, and controls the resource allocation and the determination of the MCS level and transmission power level. For reference, the scheduler can be included in a base station controller, e.g. ACR (Access Control Router) that controls the BSs 112, 122, 132, 142, 152, 162, 172.

Hereinafter, with reference to FIG. 2, a scheduler in a radio communication system according to an embodiment of the present invention will now be described.

Figure 2:
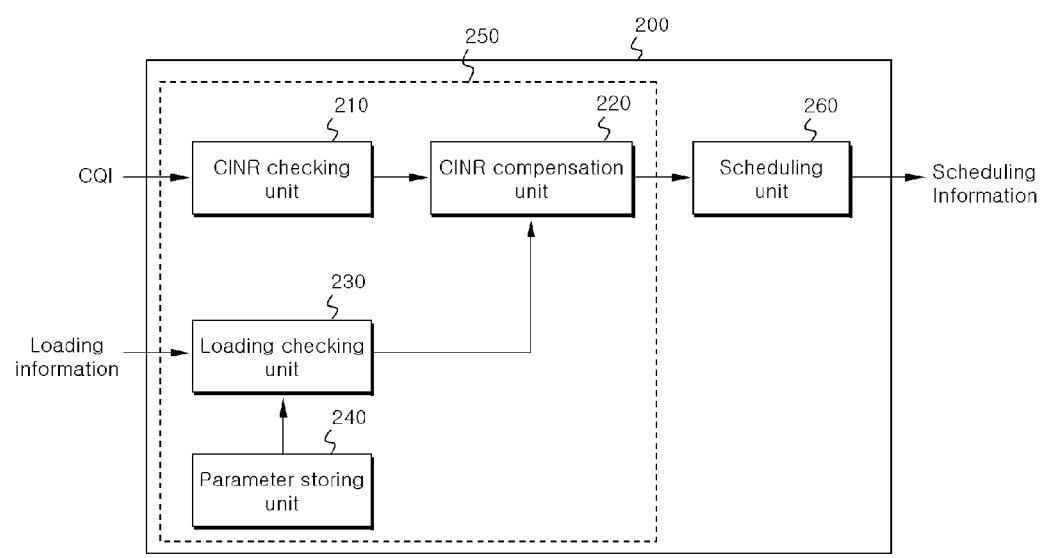
FIG. 2 is a diagram illustrating a structure of a scheduler in a radio communication system according to an embodiment of the present invention.

FIG. 2 is a diagram illustrating the structure of the scheduler according to an embodiment of the present invention.

Referring to FIG. 2, the scheduler 200 according to the present invention includes an acquiring unit 250 that acquires channel information of the MS in DL channel and a scheduling unit 260 that performs scheduling for the MS by using the channel information of the MS.

The acquiring unit 250 includes a CINR checking unit 210 that checks the CINR of the MS in DL channel, a loading checking unit 230 that checks loading factor of adjacent cells or sectors in DL channel, a parameter storing unit 240 that stores parameters for checking the loading factor of adjacent cells or sectors in DL channel, and a CINR compensation unit 220 that compensates the CINR checked in the CINR checking unit 210.

Specifically, the CINR checking unit 210 receives the CQI and checks the CINR included in the CQI. For reference, the MS estimates DL channel by using reference signals, e.g. pilot signals at reception of data, measures the CINR in DL channel by using the pilot signals, and transmits the CQI containing the CINR to the BS. Similarly, the MS also can estimate DL channel and measure the CINR in DL channel by using preamble signals. For reference, the pilot can be classified into a common pilot that is common for all MSs in DL sub-frame and a dedicated pilot that is dedicated to the corresponding MS in DL sub-frame.

The receiver of the BS receives the CQI and transmits the CQI to the CINR checking unit 210. The CINR checking unit 210 checks the CINR in DL channel by using the CQI.

The loading checking unit 230 receives the loading information and checks an average loading factor included in the loading information. Herein, the loading information includes the average loading factor of adjacent cells or sectors, and can further include information about the DL burst region of adjacent cells or sectors.

The BSs managing adjacent cells or sectors measure corresponding loading factor when the MS measures the CINR in DL channel, calculate the average loading factor by using the loading factor and moving average factor, include the average loading factor in the loading information, and transmit the loading information to other BSs and the base station controller that controls the BSs. The BSs managing adjacent cells or sectors respectively perform the scheduling for MSs which receive communication service in adjacent cells or sectors, include DL burst region information of adjacent cells or sectors in the loading information, and transmit the loading information to other BSs and the base station controller that controls the BSs. Herein, the DL burst region information includes information about a position and size of the DL burst region and information about data which are transmitted through the DL burst region (e.g. data size, service type for data).

When data are transmitted through the DL burst region, interferences occur among adjacent cells or sectors. In this case, the BSs managing adjacent cells or sectors measure the loading factor in DL burst region through which data are transmitted. That is, when the MS measures the CINR, the BSs managing adjacent cells or sectors measure the loading factor in DL burst region, calculate the average loading factor by using the measured loading factor and moving average factor, include the average loading factor in the loading information, and transmit the loading information to other BSs and the base station controller that controls the BSs. Herein, the moving average factor is determined in consideration of the mobility of the MS and the change of the position and size of the DL burst region in DL sub-frame every frame. The receiver of the BS receives the loading information of adjacent cells or sectors from other BSs and the base station controller through the backbone network, and transmits the loading information of adjacent cells or sectors to the loading checking unit 230.

The loading checking unit 230 receives the loading information of adjacent cells or sectors from the receiver of the BS, receives parameters for checking the loading factor of adjacent cells or sectors from the parameter storing unit 240, and can further receive DL burst region information of the MS from the transmitter of the BS. Herein, the DL burst region information of the MS includes information about the position and size of the DL burst region and information about data of the MS which are transmitted through the DL burst region (e.g. data size, service type for data). The transmitter of the MS recognizes information about the DL burst region of the MS at transmitting data to the MS, and transmits the DL burst region information of the MS to the loading checking unit 230. Herein, the DL burst region information can be scheduling information that the scheduling unit 260 outputs for the DL sub-frame.

The loading checking unit 230 checks the average loading factor of adjacent cells or sectors which is included in the loading information, calculates effective loading factor of adjacent cells or sectors for the DL burst region of the MS by using the average loading factor and the parameters received from the parameter storing unit 240, and transmits the effective loading factor to the CINR compensation unit 220. Herein, the effective loading factor denotes a weigh of interference that has a real effect on adjacent cells or sectors in the DL burst region. The parameters are parameters for calculating the effective loading factor of adjacent cells or sectors for the DL burst region of the MS from the average loading factor of adjacent cells or sectors, and include a normalized distance parameter between adjacent cells or sectors and a circumstance parameter of multi-cell or multi-sector environment. Herein, the normalized distance parameter and the environment parameter are stored in the parameter storing unit 240.

The loading checking unit 230 calculates a weight factor of adjacent cells or sectors by using the normalized distance parameter and the circumstance parameter, and calculates the effective loading factor of adjacent cells or sectors by using the weight factor and the average loading factor of adjacent cells or sectors. In this case, the loading checking unit 230 calculates the weight factor for each adjacent cell or sector, performs arithmetic operation for the weight factor for each adjacent cell or sector and the average loading factor, and calculates the effective loading factor by summing the results thereof for all adjacent cells or sectors.

When the loading checking unit 230 calculates the weight factor of adjacent cells or sectors, the loading checking unit 230 checks the position and size of the DL burst region of the MS through the DL burst region information of the MS, and checks the position and size of the DL burst region of adjacent cells or sectors through the DL burst region information of adjacent cells or sectors which is included in the loading information. The loading checking unit 230 compares the position and size of the DL burst region of the MS and the position and size of the DL burst region of adjacent cells or sectors, calculates overlap/adjacency of the DL burst region of adjacent cells or sectors for the DL burst region of the MS, and calculates the weight factor of adjacent cells or sectors by further considering the overlap/adjacency. The loading checking unit 230 transmits the effective loading factor of adjacent cells or sectors to the CINR compensation unit 220.

Herein, the weight factor, the average loading factor, and the effective loading factor of adjacent cells or sectors can be calculated by the following Equation 1. In Equation 1, $w_i$ denotes a weight factor of $i^{th}$ interference cell or sector, r denotes a normalized distance parameter of $i^{th}$ interference cell or sector, and $\beta$ denotes a circumstance parameter. $LF_i^t$ denotes an effective loading factor of $i^{th}$ interference cell or sector at t frame, $\alpha$ denotes a moving average factor, $lf_i^t$ denotes a measured loading factor of $i^{th}$ interference cell or sector at t frame, $LF_{\mathit{eff}}^t$ denotes an effective loading factor of interference to serving cell at t frame, and K denotes the number of interference cells or sectors.

$$w_i = r^\beta$$
$$LF_i^t = \alpha \times lf_i^t + (1-\alpha) \times lf_i^{t-1}$$
$$LF_{\mathit{eff}}^t = \sum_K w_i \times LF_i^t$$

[Equation 1]

The CINR compensation unit 220 receives the CINR measured by the MS from the CINR checking unit 210, and checks the effective loading factor of adjacent cells or sectors from the loading checking unit 230. Then, the CINR compensation unit 220 compensates the CINR measured by the MS with the effective loading factor of adjacent cells or sectors, and outputs the compensated CINR to the Scheduling unit 260. In this case, the CINR compensation unit 220 calculates a compensation factor by using the effective loading factor of adjacent cells or sectors, generates the compensated CINR by adding the compensation factor to the CINR measured by the MS, and outputs the compensated CINR to the Scheduling unit 260. Owing to the CINR compensation in CINR compensation unit 220, the acquiring unit 250 can exactly acquire the CINR of the MS in DL channel, and thus can exactly acquire the channel information of the MS.

Herein, the compensation factor can be calculated by the following Equations 2. In Equation 2, $CINR_{com}$ denotes a compensation factor, and the CINR compensation unit 220 can further consider a margin value to the compensation factor.

$$CINR_{com} = 10 \times \log_{10}(1/LF_{\mathit{eff}}^i)$$

[Equation 2]

The Scheduling unit 260 receives the compensated CINR from the CINR compensation unit 220, allocates a resource for the MS by using the compensated CINR, determines the MCS level and the transmission power level, controls the determination of the MCS level and the transmission power level, and transmits scheduling information to a MAP generating unit (not shown).

Hereinafter, with reference to FIG. 3, a scheduling process of the scheduler according to an embodiment of the present invention will now be described.

Figure 3:
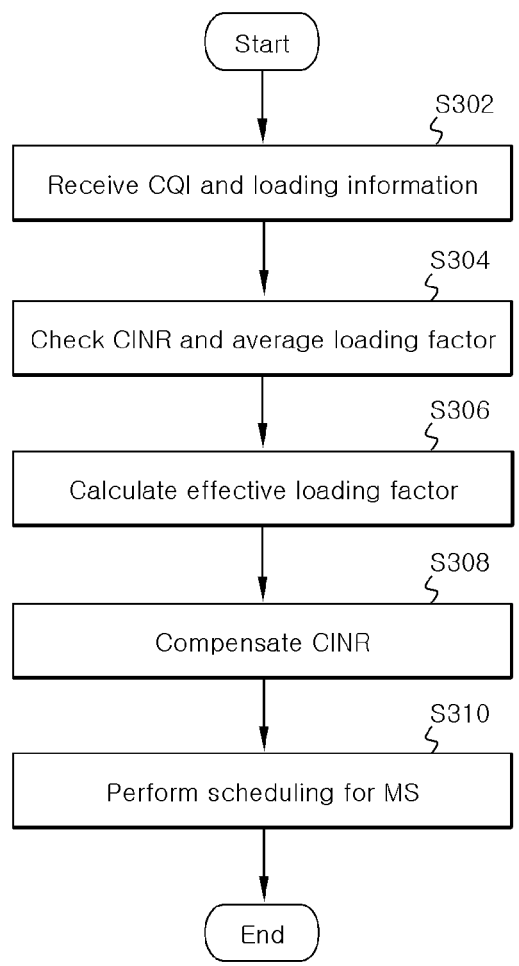
FIG. 3 is a flowchart illustrating a method for scheduling in a radio communication system according to an embodiment of the present invention.

FIG. 3 is a flowchart illustrating a method for scheduling in a radio communication system according to an embodiment of the present invention.

Referring to FIG. 3, in Step S302, the scheduler receives the CQI from the MS and the loading information of adjacent cells or sectors from the BSs managing adjacent cells or sectors. In this case, the MS estimates the DL channel by using the pilot signals, measures the CINR in DL channel by using the pilot signals, and transmits the CQI containing the measured CINR to the BS. The BSs that manage adjacent cells or sectors, measure corresponding loading factor when the MS measures the CINR in DL channel, calculate the average loading factor by using the loading factor and moving average factor, include the average loading factor in the loading information, and transmit the loading information to other BSs and the base station controller that controls the BSs.

In Step S304, the scheduler checks the CINR measured by the MS from the CQI, and checks the average loading factor of adjacent cells or sectors from the loading information.

In Step S306, the scheduler calculates the weight factor of adjacent cells or sectors by using the normalized distance parameter and the circumstance parameter, and calculates the effective loading factor of adjacent cells or sectors by using the weight factor and the average loading factor. For example, the scheduler calculates the weight factor for each adjacent cell or sector, performs arithmetic operation for the weight factor for each adjacent cell or sector and the average loading factor, and calculates the effective loading factor by summing the results thereof for all adjacent cells or sectors.

In this case, if the scheduler receives the DL burst region of the MS and the DL burst region of adjacent cells or sectors in Step S302, in Step S306, the scheduler checks the position and size of the DL burst region of the MS through the DL burst region information of the MS, checks the position and size of the DL burst region of adjacent cells or sectors through the DL burst region information of adjacent cells or sectors which is included in the loading information, compares the position and size of the DL burst region of the MS and the position and size of the DL burst region of adjacent cells or sectors, calculates overlap/adjacency of the DL burst region of adjacent cells or sectors for the DL burst region of the MS, and calculates the weight factor of adjacent cells or sectors by further considering the overlap/adjacency.

In Step S308, the scheduler generates the compensation factor by using the effective loading factor of adjacent cells or sectors, and compensates the CINR by adding the compensation factor to the CINR measured by the MS. Owing to the compensation of the CINR, the scheduler can exactly acquires the CINR of the MS in DL channel.

In Step S310, the scheduler allocates resources for the MS by using the acquired CINR, determines the MCS level and the transmission power level, and control the determination of the MCS level and the transmission power level.

While the invention has been shown and described with reference to a certain preferred embodiment thereof, it will be understood by those skilled in the art that various changes in form and details may be made therein without departing from the spirit and scope of the invention as defined by the appended claims.

The invention claimed is:

1. An apparatus for acquiring channel information in a radio communication system, the apparatus comprising:
a CINR (Carrier to Interference and Noise Ratio) checking unit configured to check a CINR corresponding to a downlink (DL) channel based on channel quality information of a mobile station;
a loading checking unit configured to calculate an average loading factor for each of cells causing interferences to a serving cell by using loading information for each of the cells; and
a CINR compensation unit configured to calculate a weight factor for each of the cells by using a normalized distance parameter and a circumstance parameter for each of the cells and to calculate a compensation loading factor according to the following:

$$LF_{eff}^t = \sum_K w_i \times LF_i^t$$

wherein $LF_{eff}^t$ denotes the compensation loading factor at a 't' frame, $w_i$ denotes a weight factor of an $i^{th}$ cell, $LF_i^t$ denotes an average loading factor of the $i^{th}$ cell at the 't' frame, and K denotes the number of the cells, the CINR compensation unit being configured to calculate a compensation factor by using the compensation loading factor, and to compensate the CINR by adding the compensation factor to the CINR.

2. The apparatus of claim 1, wherein the CINR is measured by the mobile station by using reference signals in the downlink channel.

3. The apparatus of claim 2, wherein the reference signals are pilot signals or preamble signals.

4. The apparatus of claim 1, wherein the average loading factor is determined based on a moving average factor and a loading factor measured by base stations that manage the cells.

5. A method for acquiring channel information in a radio communication system, the method comprising:
receiving channel quality information of a mobile station and loading information of cells causing interferences to a serving cell;
checking a CINR (Carrier to Interference and Noise Ratio) included in the channel quality information;
calculating an average loading factor for each of the cells by using the loading information for each of the cells;
checking a normalized distance parameter of the cells and a circumstance parameter of the cells;
calculating a weight factor for each of the cells by using the normalized distance parameter and using the circumstance parameter for each of the cells;
calculating a compensation loading factor according to the following:

$$LF_{eff}^t = \sum_K w_i \times LF_i^t,$$

wherein $LF_{eff}^t$ denotes the compensation loading factor at a 't' frame, $w_i$ denotes a weight factor of an $i^{th}$ cell, $LF_i^t$ denotes an average loading factor of the $i^{th}$ cell at the 't' frame, and K denotes the number of the cells;
calculating a compensation factor by using the compensation loading factor; and
acquiring channel information of the mobile station after compensating the CINR by adding the compensation factor to the CINR.

6. The method of claim 5, wherein the CINR is measured by the mobile station by using reference signals in a downlink channel.

7. The method of claim 6, wherein the reference signals are pilot signals or preamble signals.

8. The method of claim 5, wherein the average loading factor is determined based on a moving average factor and a loading factor measured by base stations that manage the cells.

* * * * *